United States Patent [19]
Deschamp et al.

[11] Patent Number: 5,899,931
[45] Date of Patent: May 4, 1999

[54] SYNCHRONOUS TELEMETRY TRANSMISSION BETWEEN A PROGRAMMER AND AN AUTONOMOUS DEVICE

[75] Inventors: Herve Deschamp, Suresnes, France; Chik Yam Lee, Arcueil, France

[73] Assignee: ELA Medical S.A., Montrouge, France

[21] Appl. No.: 08/869,133

[22] Filed: Jun. 4, 1997

[30] Foreign Application Priority Data

Jun. 4, 1996 [FR] France ..................................... 96-6824

[51] Int. Cl.[6] .............................. A61N 1/362; A61N 1/37
[52] U.S. Cl. ................................ 607/60; 607/32; 128/903
[58] Field of Search ......................... 607/32, 60; 128/903

[56] References Cited

U.S. PATENT DOCUMENTS

| | | | |
|---|---|---|---|
| 4,701,939 | 10/1987 | Stutt et al. | 395/115 |
| 4,918,406 | 4/1990 | Baumbach et al. | 331/117 R |
| 4,943,985 | 7/1990 | Gherardi | 375/111 |
| 4,947,407 | 8/1990 | Silvian | 607/32 |
| 5,241,961 | 9/1993 | Henry . | |
| 5,314,450 | 5/1994 | Thompson et al. | 607/32 |
| 5,354,319 | 10/1994 | Wyborny et al. | 607/32 |
| 5,384,828 | 1/1995 | Brown et al. | 379/61 |
| 5,448,571 | 9/1995 | Hong et al. | 370/105.4 |
| 5,522,866 | 6/1996 | Fernald | 607/60 |
| 5,674,265 | 10/1997 | Deschamp et al. | 607/60 |
| 5,741,314 | 4/1998 | Daly et al. | 607/60 |
| 5,769,876 | 6/1998 | Silvian | 607/32 |

FOREIGN PATENT DOCUMENTS

| | | | |
|---|---|---|---|
| 1212723 | 10/1986 | Canada | H04L 7/08 |
| 84787 | 8/1983 | European Pat. Off. | H04L 7/08 |
| 342460-A1 | 11/1989 | European Pat. Off. | H04L 7/04 |
| A-07-213968 | 11/1990 | Japan . | |

OTHER PUBLICATIONS

Darnel "A Novel DSP–Based Data Synchronization Technique" IEEE International Conference on Communication, May 23–26, 1993, Vol. 213, pp. 821–825.

*Primary Examiner*—William E. Kamm
*Assistant Examiner*—Carl H. Layno
*Attorney, Agent, or Firm*—Orrick, Herrington & Sutcliffe LLP

[57] ABSTRACT

An active implanted medical device, particularly an active implantable medical device, and its external programmer having a bi-directional synchronous transmission of data. The active implanted medical device (10) includes a timing clock (18) and circuits for the emission/reception of signals operating under the temporal control of the timing clock of the active implanted medical device. The programmer (24) includes a timing clock (42) and circuits for the emission/reception of signals, operating under the temporal control of the programmer timing clock. The device (10) and programmer (24) exchange data there-between using a bi-directional synchronous serial connection, in which the programmer timing clock (42) is a programmable clock, adjustable in phase, and the programmer has a synchronization control circuit (32, 36, 38, 40) cooperating with its programmable timing clock, to analyze a signal received from the active implanted medical device and to lock in phase the programmer programmable timing clock on the timing clock of the active implanted medical device.

20 Claims, 4 Drawing Sheets

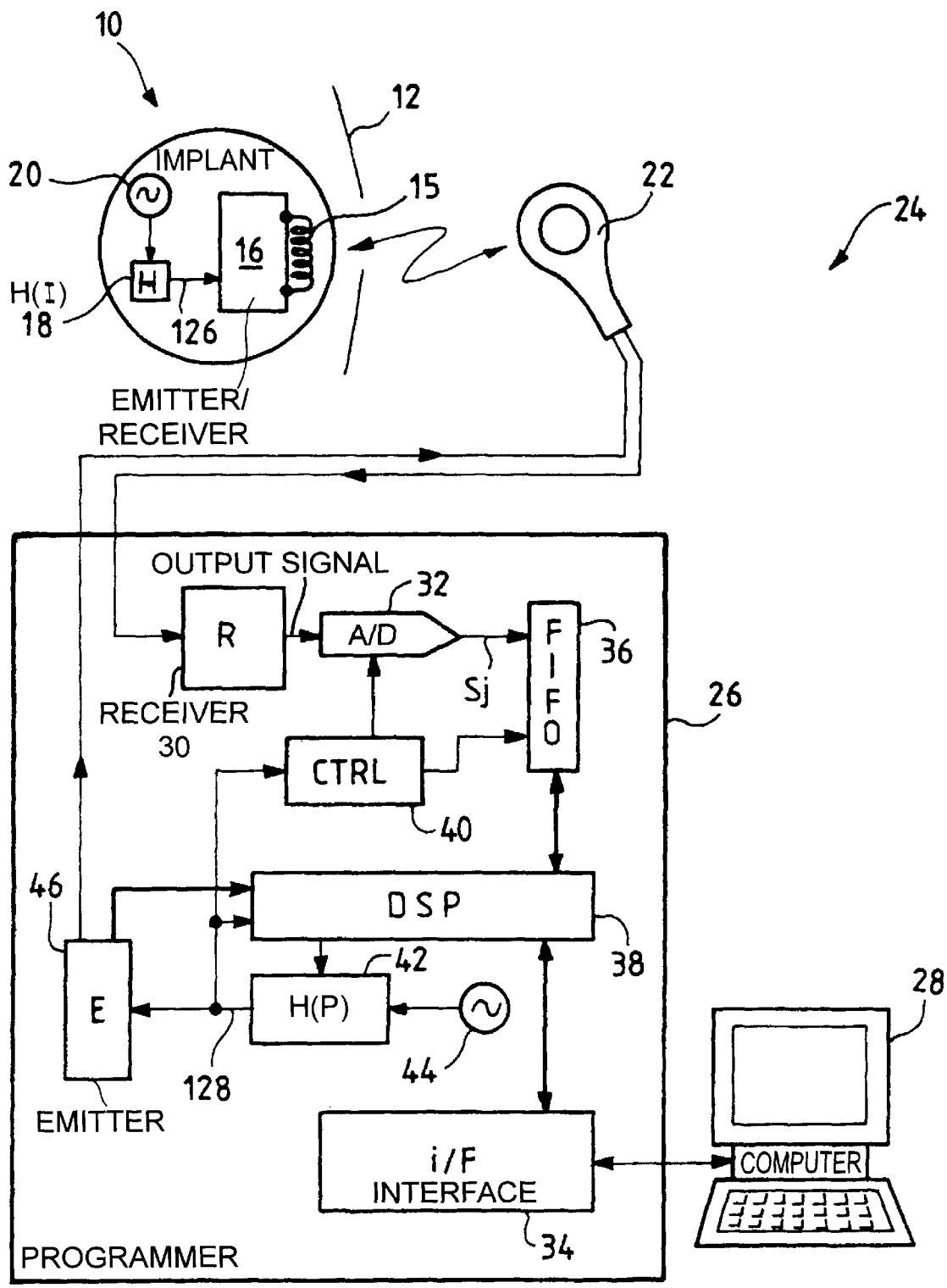
FIG_1

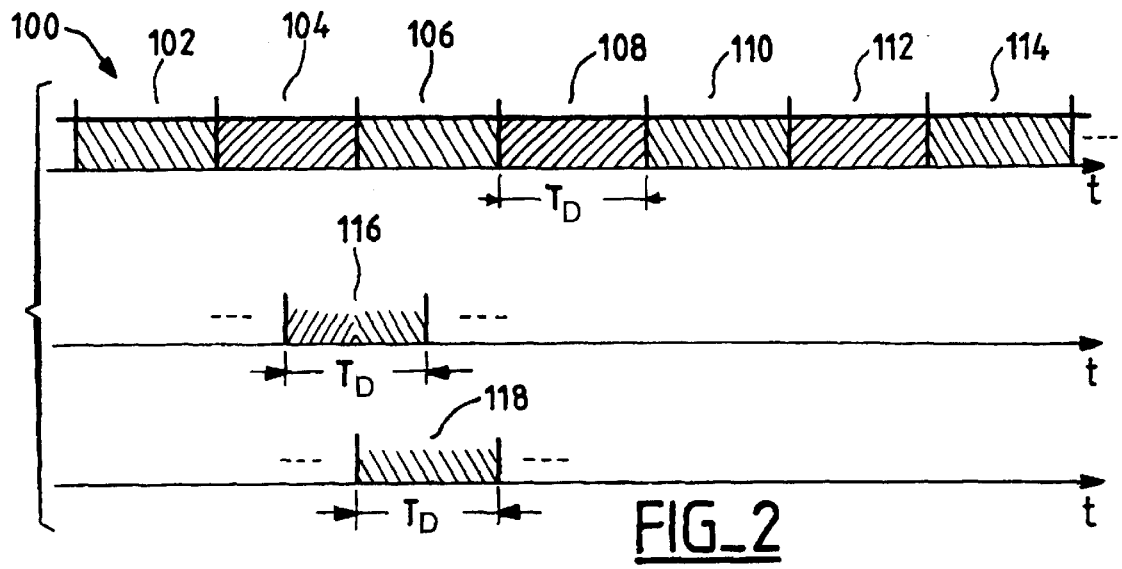
FIG_2
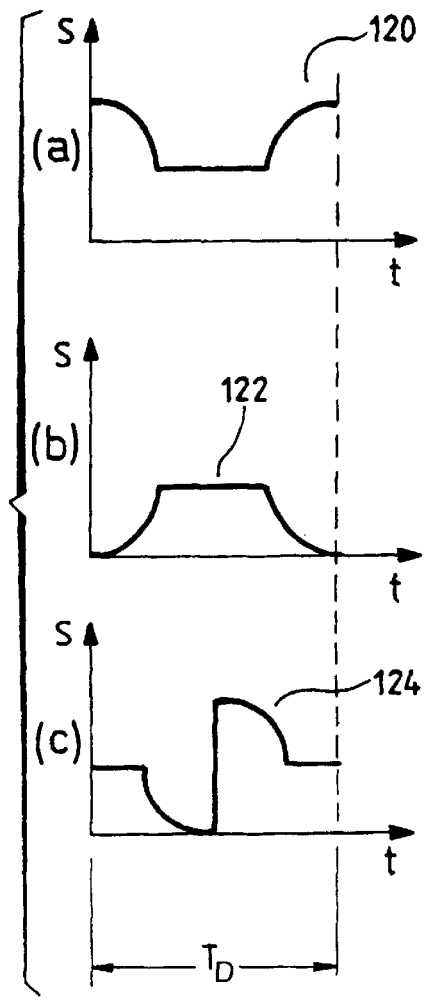
FIG_3
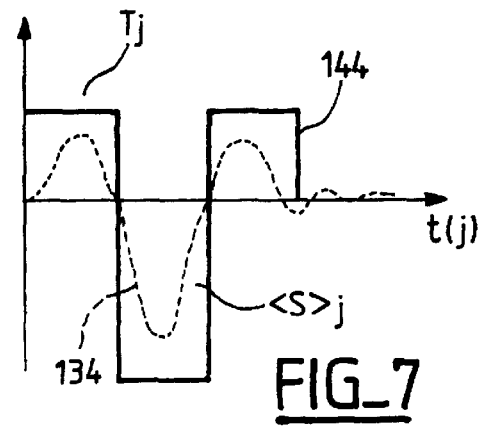
FIG_7
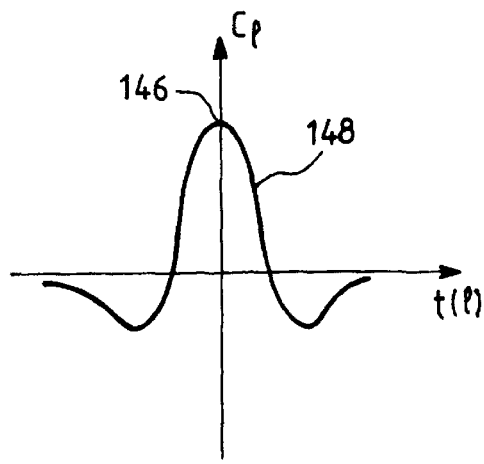
FIG_8

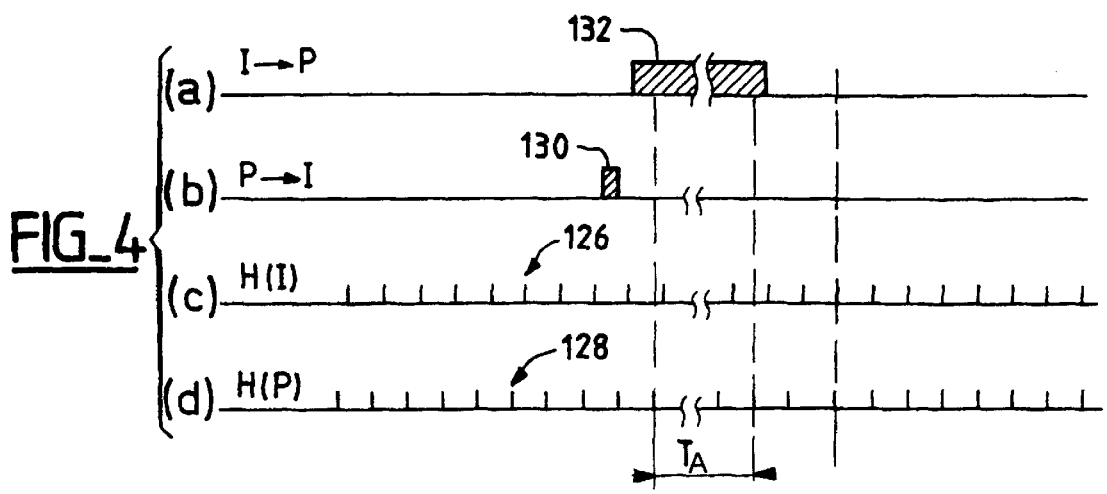
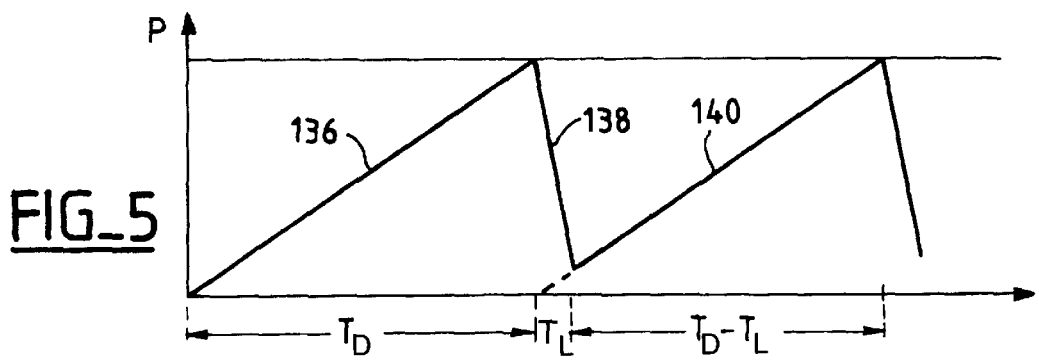
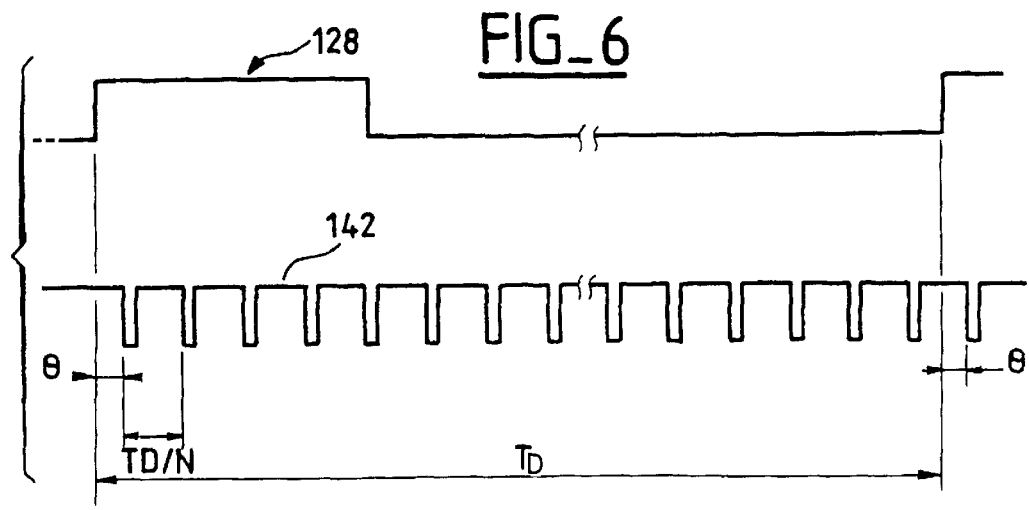

SYNCHRONOUS TELEMETRY TRANSMISSION BETWEEN A PROGRAMMER AND AN AUTONOMOUS DEVICE

FIELD OF THE INVENTION

The present invention concerns the area of autonomous devices, particularly active implanted medical devices, and more particularly the exchange of data during communication sequences between the autonomous device and an external control console.

BACKGROUND OF THE INVENTION

Active implanted medical devices comprise particularly cardiac pacemakers, defibrillators, neurological devices, pumps for the delivery of medical substance (so-called diffusion pumps) and cochlear implants. These devices, once put in place, are programmed from the exterior by use of a remote or distant console called a "programmer". The invention, however, is not limited to active implanted medical devices. Indeed, although the invention is described with reference to active implanted medical devices, the invention also applies to medical devices that are not implanted (for example, devices carried by the patient), and to non-active medical devices (for example, devices, whether or not implanted, that are without a source of energy (e.g., a battery) and which use for the emission of signals to the exterior a portion of the energy of an interrogating signal that is applied to the device), and to autonomous devices other than medical devices. The reference to an "implant" in the description is, therefore, not in itself restrictive to implanted medical devices and should be construed synonymous with autonomous device (except when used as an adverb to a medical device).

The verification of parameters of the implant or the transmission of information to be recorded (stored) by the implant is realized by electromagnetic inductive coupling, called "telemetry" in the technique in question. Thus, a programmer communicates with an autonomous device by telemetry.

Each programmer is provided with a receiver head that is placed in face of, that is in the proximity to the site of, the implant. The head comprises a coil (also called an antenna) that collects the magnetic field generated from or by the implanted device. The programmer also is configured to send information to the implant by electromagnetic means. This is typically done by causing a current in the programmer coil to oscillate, which current will provoke a voltage at the output of the reception coil of the implant, and produce a voltage on the implant coil leads. These voltages are collected (sensed) and decoded by the implant.

Signals emitted by the implant are collected by the programmer coil, amplified, filtered, digitized and decoded by the programmer circuits. This allows one to realize a transmission in two directions between the implant and the programmer (i.e., bi-directional telemetry). It is noted that for each of the programmer and the autonomous device, the coil used for receiving signals can also be used to transmit signals, although different coils or different combinations of coils may be used for receiving and sending.

It has been previously proposed to operate data transmission in a synchronous mode between an implant and a programmer. In the known technique, the programmer possesses a clock that defines the rhythm (rate) of data transmission, which rate is imposed on the implant when the implant has data to emit in the direction of the programmer. This technique, if it is able to benefit from the advantages of a synchronous transmission, is nevertheless limited in its possibilities of implementation because it presupposes that the implant is able to measure, establish, and maintain the cadence of the transmission rate imposed by the programmer.

In practice, it is indispensable to limit the transmission rate if this condition is to be satisfied in a quasi-certain manner, independent of the type of implant that is interrogated by the programmer. In others words, it is desirable, if not necessary, to find a compromise between the speed of the synchronous transmission and the security of transmission. Too high a speed will present a risk of losing the synchronism during the transmission, and, therefore, result in the erroneous interpretation by the programmer of the transmitted data.

OBJECTS AND SUMMARY OF THE INVENTION

It is, therefore, an object of the present invention to overcome the aforementioned limitations of the known devices by a new technique of establishing and maintaining the synchronism of the transmission.

It is another object of the invention to allow a bi-directional exchange of data between an implant and a programmer with high speed of transmission and a maximal degree of reliability.

To this end, the invention proposes to establish a serial synchronous transmission between the implant and the programmer and to maintain the synchronism during the whole duration of the exchange of data.

Broadly, the invention proposes, instead of adjusting the data transmission rate by the implant to a frequency imposed by the programmer, to provide the programmer with a programmable clock, adjustable in phase, and to synchronize this programmable clock on the clock of the implant. The implant is then free to emit data at its clock frequency, which will be able to be greater than the frequencies typically used up until now, and the programmer is then synchronized on this implant clock frequency. More preferably, the programmer clock is synchronized to lock on the implant transmission frequency by a periodic adjustment (tuning), realized in real time.

One also will understand that proceeding in this manner allows for simplifying the circuits of the implant, with a correlative lowering of the cost of the implant circuits, such that any increase in the complexity of the circuits is placed on the side of the programmer. In others words, one can increase substantially the technical performance of the implant without increasing the cost of the implant, and perhaps even lower the implant cost.

One aspect of the invention concerns a system including, on the one hand, an autonomous device, particularly an active implantable medical device including a timing clock and a telemetry system that emits signals in direction of the programmer and receives signals issued by the programmer, with the telemetry system operating under the temporal control of the autonomous device timing clock, and, on the other hand, a device that is an external programmer for the autonomous device, including a timing clock and a telemetry system that emits signals in the direction of the autonomous device and receives signals originating from the autonomous device, the programmer telemetry system operating under the temporal control of the programmer timing clock, in which the link of the data exchange between the autonomous device and the programmer is a bi-directional synchronous serial link, the programmer timing clock is a programmable clock, adjustable in phase, and the programmer includes a synchronization control circuit which cooperates with the programmable timing clock to analyze a signal received from the autonomous device and to lock in phase the programmer timing clock on the timing clock of the autonomous device.

Very advantageously, to establish initially the synchronism, the autonomous device emits in direction of the programmer a synchronization signal which is emitted according to the autonomous device timing clock frequency. The programmer receives the synchronization signal, correlates the received signal with a reference pattern, determines a difference, and adjusts the programmer programmable clock by a value corresponding to the determined difference.

The synchronization signal can be preferably emitted by the autonomous device in response to an interrogation signal emitted by the programmer, the interrogation signal being one that is recognizable by the autonomous device even in the absence of any synchronism of the transmission. In one embodiment, the synchronization signal is preferably a periodic signal, and the programmer synchronization control circuit includes a means for averaging the periodic signal before making a correlation with the reference pattern.

Even more advantageously, to maintain the synchronism once it is initially established, the synchronization control circuit of the programmer includes a means to receive a data signal emitted by the autonomous device, to correlate the continuation by periodicity of the data signal received, that is, the repetition of a signal (i.e. a symbol) during successive periodic time intervals, with a reference pattern to determine a temporal difference, and to adjust the programmable clock by a value corresponding to the determined temporal difference.

The programmer synchronization control circuit can be implemented to perform the foregoing functions in any number of ways, for example, by a programmable digital circuit, more particularly a digital signal processor, operating under the control of a software program loaded in a memory. Further, the software control program is preferably a downloadable program so as to be able to modify the program without hardware modification of the programmer. Other aspects of the invention concern a programmer that can be automatically synchronized to an implant having a synchronization signal output, and a method of establishing synchronization between an autonomous device and an implant particularly acting implantable medical device, as will become clear in the following.

BRIEF DESCRIPTION OF THE DRAWINGS

Other characteristics and advantages of the present invention will appear to a person of ordinary skill in the art in view of the following detailed description of a process of implementation of the invention, made with reference to the annexed drawings, in which:

FIG. 1 is a block diagram of the implant and the programmer circuits for the reception and processing of signals;

FIG. 2 is a representation of various timings plots illustrating the interest of a synchronous transmission;

FIG. 3 illustrates the risk of error in the interpretation of signals of FIG. 2 in the case of defects in synchronism;

FIG. 4 illustrates the principle of re-synchronization used by the present invention;

FIG. 5 illustrates the mode of synchronous access, in reading and simultaneous writing of a FIFO memory;

FIG. 6 illustrates the dependence between the programmable clock and control signals of an analog/digital converter;

FIGS. 7 and 8 illustrate the steps, implemented in accordance with a preferred embodiment of the process of the invention, of correlation of the synchronization signal with a reference pattern;

DETAILED DESCRIPTION OF THE INVENTION

Figure 9:
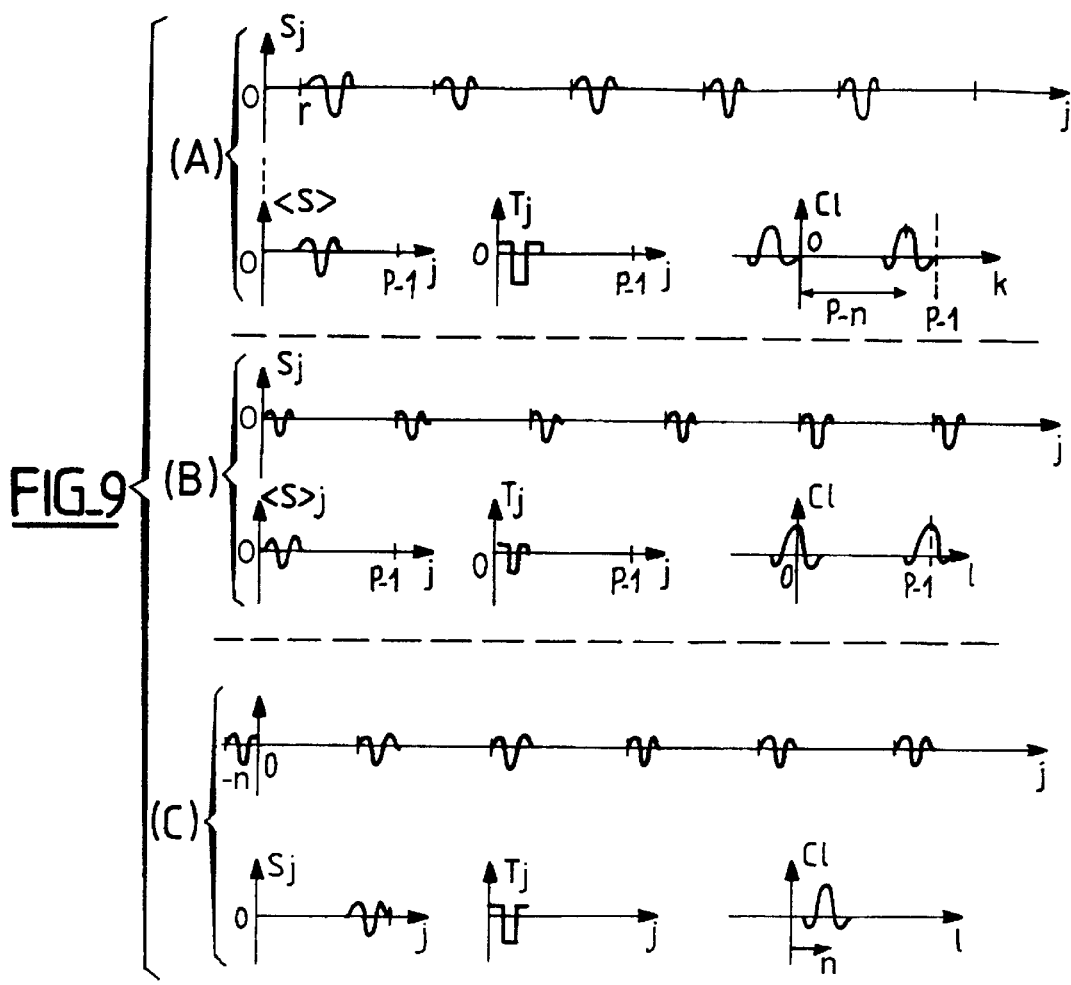
FIG. 9 represents, in the temporal reference of the programmer, a suitable analysis made by the programmer for determining the difference between the programmer clock and the implant clock.

With reference to FIG. 1, the reference 10 designates an "autonomous device" or "implant" in the broad sense defined above, and, in this illustrated example, a medical device implanted in a patient, beneath the cutaneous barrier 12. The implant 10 comprises a housing or case 14 containing various electronic circuits, particularly including a memory storing information that can be transmitted to the exterior, and/or information that can be updated, by a bi-directional "telemetry" transmission. The case 14 circuits are able to generate a varying magnetic induction field that is provoked by the passage of currents oscillating in a coil (antenna) 15 in a manner itself well-known. The implant 10 also includes electronic circuit 16 which operates under the temporal control of an integrated clock 18, which is in turn controlled by an oscillator 20. Signals emitted by the implant 10, that are of essentially of a magnetic nature as explained above, are collected by the receiver head or "programming head" 22 of a programmer 24, that is, for example, a device of a type comparable to that described in EP-A-0 661 077 and its corresponding U.S. patent application Ser. No. 08/363,742, now issued as U.S. Pat. No. 5,674,265, to which one will be able to refer for further details regarding the manner by which these signals are collected or processed, and which U.S. Patent Application is co-pending and commonly assigned and incorporated herein by reference in its entirety. The head 22 also can operate as an emitter for the transmission of signals from the programmer 24 to the implant 10.

Structure of the Programmer System

The programmer 24 comprises, essentially, in addition to head 22, a housing or case 26 containing the telemetry system, namely the circuits for the emission/reception and processing of the telemetry signals, as well as an interface (I/f) 34 for a remote processing unit 28. Unit 28 is generally in the form of a microcomputer/personal computer that is connected to the case 26 by a cable. Data can be exchanged between the programmer 24 and the microcomputer unit 28 via a data bus, using, for example, the bus standard PCMCIA, which allows one to use for the microcomputer unit 28 any type of device having a port that conforms to this standard.

More preferably, the case 26 contains a circuit 30 for the reception of signals collected by the head 22 from the implant 10, and a system of circuits for analog processing of the signal, which provide, in a known manner, signal conditioning, namely the amplification, filtering, etc., of the collected signal (as described for example, in the aforementioned EP-A-0 661 077 and U.S. application Ser. No. 08/363,742). The circuit 30 thus delivers an output signal designated OUTPUT-SIGNAL to an analog to digital converter 32, that, in turn, delivers as an output a set of signal samples $S_j$. Samples $S_j$ are then analyzed, using a FIFO memory 36, the role and functioning of which is described in more detail below, by processing circuit 38. Processing circuit 38 performs certain calculations and the programmable sequential control, and is advantageously realized in the form of a digital signal processor (hereinafter DSP 38). DSPs are indeed known for their ability to perform easily calculations while knowing how to address peripheral devices, all the while under the control of a suitable control program.

The filling of the FIFO memory 36 is preferably sequenced by a control circuit 40, and the reading of FIFO memory 36 can be realized in an asynchronous manner by DSP 38.

The control program for DSP 38 can be contained in a typical memory device, e.g., ROM, PROM or RAM, FLASH, EEPROM, etc., (not shown) in a manner in itself known and therefore not described here.

Nevertheless, to provide the present invention with the flexibility of functioning and an evolution that is peculiar to systems controlled by a program, one can foresee to download the control program for DSP 38 from the microcomputer unit 28, with the memory storing the program for DSP 38 being then essentially a RAM-type memory, with simply a ROM containing a "boot" program for the start of the control of the downloading of the control program to the RAM from the microcomputer unit 28, as well as a fail-safe program to commute the implant to operation in a nominal mode if the commutation between the programmer 26 and the microcomputer unit 28 is defective, and therefore prevents proper downloading of the control program.

One such manner of proceeding allows the behavior of the device according to the invention to evolve over time, for example, to adapt the programmer system (comprising head 22, case 26 and microcomputer unit 28) to implants of types not yet defined, without modifying the programmer system other than the installation of a new version of the control program in the microcomputer unit 28. The downloading of the control program thus allows one to install modifications without any change of the head 22 or the programmer case 26, simply by distributing an update diskette. This is desirable in contrast to the known techniques which, until now, have required the physical opening of the programming head and the change of a memory hardware component (EPROM). It should be understood that case 26 could be integrated into microcomputer unit 28 (or vice versa) when desired for cost, cosmetic or marketing reasons.

The programmer case 26 also contains a timing clock 42, which is controlled by an oscillator 44. In a characteristic manner of the invention, the clock 42 is a programmable type clock. As will be discussed below with reference to FIG. 6, clock 42 has an output frequency pulse train 142 (a so-called the "digitizing clock signal") which is synchronized by a timing clock frequency pulse train 128, and the frequency of clock pulses 142 is a whole multiple of the frequency of clock pulses 128.

The programmer case 26 contains also an emission circuit 46, also driven by the clock pulses 128 (FIG. 6), and which operates under the control of DSP 38. This emission circuit thus provokes the passage of oscillating currents to a coil contained in the head 22 in a manner to insure the transmission of information from the programmer to the implant.

One can thus establish a bi-directional communication between implant 10 and programmer 24. The order and the type of messages exchanged between the implant 10 and the programmer 24, in one direction or the other, can be determined by the use of higher level software programming, as may be appropriately selected, by the microcomputer unit 28, whose instructions are read, via an interface 34, by the calculation and control functions of DSP 38. In particular, it is from the microcomputer unit 28 that the order to begin a bi-directional communication between programmer and implant will be sent. When this communication begins, and until it ends, messages will pass according to different steps, the entire set of which constitutes a "session". In order that the two systems could suitably cooperate, it is necessary to anticipate and provide a suitable communication protocol, defining the format and the direction of messages.

The essential characteristic of the present invention is to be able to operate a synchronous transmission between the programmer 24 and the implant 10. More specifically, the implant and the programmer each possess, as indicated, a timing clock, respectively clocks 18 and 42 (FIG. 2), serving as the base time, and whose high frequency is typically 32,768 Hz (32 kHz). If the two clocks 18 and 42 are in phase, and their transitions serve as the origin of times for the dispatch and the reception of symbols (units of information) constituting messages in the telemetry signals, then the analysis of these symbols will be facilitated, in comparison with the case in which the programmer and the implant mutually ignore the state of their base times.

In addition to achieving a maximal reliability in the decoding of symbols, one also will be able to operate the transmission at a higher cadence (transmission rate), thereby allowing to reduce the duration of the transmission and/or to transmit a greater volume of data. The latter is particularly of interest when the autonomous device (implanted or not) records data over a very long period (e.g., in the case of typical Holter recordings (with or without data compression)).

Establishment of the Synchronism Between Implant and Programmer

FIG. 2 illustrates the interest of the synchronism between the transmitter system and the receiver system for a correct decoding of the emitted symbols. The transmitter sends to the receiver a message 100 having a plurality of symbols 102, 104, . . . 114, . . . , and the task of the receiver is to receive, analyze and recognize successive symbols so as to decipher correctly the message.

If one designates a time $T_D$ as the time necessary for the transmitter to emit a given symbol, and if the receiver analyzes the message during a duration $T_D$ to which it is not synchronized, the analysis may well focus on parts of two successive symbols, as illustrated by the different "cross-hatchings" of signal 116 on the second line of the time-diagram of FIG. 2. On the other hand, if the receiver is in synchronism with the transmitter, the analysis will focus on a single symbol, as illustrated by the uniform "cross-hatchings" of signal 118 on the third line of the time-diagram of FIG. 2. Only a correct synchronization allows one to use correctly the duration $T_D$ to analyze the message. This will be further explained with reference to FIG. 3.

Suppose that an "alphabet" (that is, a system of symbols susceptible to be transmitted in a telemetry signal transmission) is an alphabet with two symbols 120 and 122 as illustrated in curves (a) and (b) on FIG. 3, in units of amplitude (S) versus time (t). If the analysis begins at the same time as the appearance of the symbol, the recognition of the symbol will be possible. On the other hand, for an identical analysis time, but badly localized relative in time to a given symbol, the result of an analysis will be a symbol not belonging to the alphabet, as illustrated in curve (c) on FIG. 3, where one has represented a "message" 124 comprising part of a symbol 122 followed by part of a symbol 120 (nonsynchronized). If one analyzes this message 124 during a duration $T_D$ that is delayed in relation to the beginning of the symbol 120 (nonsynchronized), one obtains the message 124 that is not a valid symbol belonging to the alphabet.

When one operates a nonsynchronous transmission, one has, in a manner in itself known, to operate the analysis on a duration greater than $T_D$, which therefore requires an increase in the time between symbols (inter-symbol time) and its associated costs, as compared to a situation where there is synchronism. The lack of synchronism also often results in an increase in the processing means calculations and a loss in the speed of transmission.

If $T_D$ is the time between symbols, and N is the number of symbols in the alphabet, the transmission rate, in bits/second will be:

$$D=(1/T_D) \log_2 (N).$$

One is going now to describe the principle of obtaining synchronism as implemented by the present invention, with reference to FIG. 4.

In FIG. 4, timing line (a) represents an emitted message 132 from the implant (I) to the programmer (P), timing line (b) represents an emitted message 130 from the programmer P to the implant I, timing line (c) represents clock timing pulses emitted by the implant H(I), and timing line (d) represents clock timing pulses of the programmer H(P), these two clocks each operating at a fixed frequency $F_0$. Given the two clocks establishing the timing of messages, one has then $F_0=1/T_D$.

If one considers the programmer and the implant before there has been an exchange of data between them, their clocks have no phase relationship between them.

To establish a phase relationship, the programmer emits a request message 130 (interrogation signal) to the implant, this request being conceived so as to be comprehensible by the implant without first requiring any synchronism. In response to this request message 130, the implant replies by emitting a message 132 which is timed by the frequency of the implant clock H(I) pulses 126. The message 132, which is hereafter called the "synchronization signal", will be advantageously constituted by the repetition of the same symbol, this symbol being one that can be generated by realizing in the implant the excitation of a coil by an appropriate control means (which is not illustrated because it is a known technique), which excitation will produce an electrical current, and therefore a magnetic induction. The magnetic induction is collected by the programmer; after processing, the useful signal (that is, the voltages in the coil of the programmer) appearing at the input of the converter 32 (FIG. 1) will have a form that corresponds typically to that illustrated in dotted lines 134 on FIG. 7. The duration $T_S$ to S of this signal corresponds advantageously to a frequency $F_S=1/T_S$ equal to 128 kHz. The SIGNAL-OUTPUT is advantageously analyzed by DSP 38 after digitization by the converter 32, which provides a digital value $S_j$, advantageously of 8 bits. The signal $S_j$, before being analyzed by DSP 38, is advantageously stored in a FIFO memory 36, that, as one knows, provides accessibility in an asynchronous manner for simultaneously reading and writing. The mode of access to FIFO 36 is illustrated with reference to FIG. 5. If, in the course of an analysis window, that is during duration $T_D$, DSP 38 analyzes P samples of the signal $S_j$, it is then possible to let, in the course a phase 136, the FIFO memory fill with P values, captured at regular intervals according to a judicious timing realized by means of control circuit 40 controlling the write signal for FIFO memory 36. At the next analysis window, DSP 38 can then begin by reading, during a phase 138, the P values contained in the FIFO memory 36, while FIFO 36 continues to fill, in the course of a subsequent phase 140, with P other values.

One understands that DSP 38 can thus read in a continuous phase the P samples $S_j$ that it needs, and can then process them without interruption, avoiding thus complications of processing and loss of times inherent to a system that would not use a FIFO memory and in which, each arrival of a new value of signal, it would be necessary to provoke an interruption of the execution of operations in DSP 38 to be able to take into account this new value.

The programmer clock frequency pulse train clock 128 is produced by the division, by a number M, of the output frequency signal produced by the oscillator 44, that is, for example, a quartz oscillator at a frequency $F_{OSC}$ of 4,194,304 Hz (4 mHz). The division is realized by the circuit 42 that, controlled by DSP 38, possesses the ability to adjust (advance or delay) the phase of the clock signal delivered at the output (the clock thus being "programmable"). Rising edges of the clock pulses 128 thus serve as reference points or triggers for the circuit 40 that controls the converter 32.

FIG. 6 illustrates the manner in which control circuit 40 operates as a function of the clock pulses 128. The signal output by the oscillator 44 is divided by a number N so as to provide a signal 142 at a frequency $F_e=F_{OSC}/N$, that one will call hereafter the "sampling frequency".

Furthermore, as noted, the frequency of clock pulses 128 is the result of the division of the oscillator 44 output signal by a number M. By choosing M and N such that there exists a number P realizing the equality M=P*N, one will have therefore P periods of the clock 142 during one period between clock pulses train 128, and then $F_{e=P/TD}$.

If the control circuit 40 produces a first transition from each clock pulse 142 to an instant distinct from the transition of the rising edge of each clock pulse 128, with a temporal difference θ, then the (P+1)$^{th}$ transition from the next clock pulse 142 will arrive at the instant θ+(P/$F_e$)=θ+$T_D$, that is to say a time θ after the rising edge following from the clock pulse 128, that is then well locked in phase with the clock 142.

If one notes the number j of the transition of the clock pulse 142 after a raising edge of the clock pulse 128, and that the transitions from the clock 142 serve as the sampling signal to trigger the digitization of SIGNAL-OUTPUT by converter 32, one obtains at the output of converter 32 a series of signals $S_j$ equal, within the digitization error limit, to the values of SIGNAL-OUTPUT at j instants.

To realize the synchronization, DSP 38 realizes first of all the operation of averaging of the signal over a number K of analysis window durations $T_D$, i.e., during a duration $T_A=K*T_D$. One creates then a series of values <S>$_j$ defined by:

$$\langle S \rangle_j \atop j \in [0...P-1] = (1/K) \sum_{i=0}^{K-1} S_{(j+P_i)},$$

By operating on the signal of synchronization, where the symbol is repetitious, this operation aims solely to decrease the relative amplitude of the noise by a factor √K. The signal $\langle S \rangle_j$ will have then the form already illustrated in the dotted line curve 134 on FIG. 7, to the limit of digitization. This curve 134 will be able to be judged to be resembling close enough a pattern $T_j$, illustrated in solid line curve 144 on FIG. 7, that the system will use for correlation with $\langle S \rangle_j$, according to the operation:

$$C_l \atop l \in [0...P-1] = \sum_{j=0}^{P-l-1} T_j \langle S \rangle_{j+l} + \sum_{j=P-l}^{P-1} T_j \langle S \rangle_{(j+l-P)},$$

$T_j$ designating the $j^{th}$ point of the pattern 144. $C_l$ is then the $l^{th}$ point of the correlation function of $\langle S \rangle$ and T.

The equation above is separated in two sums, so as to keep indices on $\langle S \rangle$ comprised in the interval $[0 \ldots (P-1)]$, which is equivalent to calculate the correlation of T with the continuation by periodicity of $\langle S \rangle$, that one will designate $\langle S \rangle$. Further, the more the pattern T is similar to $\langle S \rangle$, the more the function K is similar to the auto-correlation function $\langle S \rangle * \langle S \rangle$.

One knows that the auto-correlation function $[\langle S \rangle * \langle S \rangle]_l$ is maximal for l=0, and that the correlation function $\langle S_n \rangle_j = \langle S \rangle_{j+n}$ is maximal for l=−n.

In others words, the position of the maximum 146 of the correlation function 148, illustrated in FIG. 8, between a function with limited support $\langle S \rangle$ and the translated function by its continuation by periodicity, indicates the magnitude of the transfer. It is this property that the present invention uses to realize the synchronization of clocks between the programmer and the implant, which is illustrated in FIGS. 7, 8 and 9. If the pattern $T_j$ is advantageously chosen to present a strong resemblance with the digitized and averaged signal $\langle S \rangle_j$, then the correlation function $C_l$ (curve 148 on FIG. 8) previously defined will have its maximum 146 (FIG. 8) placed at l=0 when $T_j$ and $\langle S \rangle_j$ are in coincidence, which corresponds to the configuration of FIGS. 7 and 8. FIG. 9 represents, in the temporal reference of the programmer, the suitable analysis made by the programmer for determining the difference of phase between programmer clock pulses 128 (FIG. 4) and implant clock pulses 126 (FIG. 4).

Referring to case (A) of FIG. 9, the implant clock pulses 126 present a phase delay as compared to that of the programmer, which delay one will designate the by magnitude n, the unit of time being the sampling period $1/F_e$. Symbols constituting the synchronization symbol beginning at each new transition from the clock pulse of the implant, the set of points $\langle S \rangle_j$ ($j \Sigma [0 \ldots (P-1)]$) constituting the average of symbols of the synchronization symbol which will appear also delayed by n. The correlation function with $T_j$ will present, therefore, its maximum at −n or P−n, if this correlation function, for the periodicity of period P which can be easily calculated, is analyzed over the interval $[0 \ldots (P-1)]$.

In the case (B) of FIG. 9, the clock pulses 126 and 128 are in phase and the maximum of the correlation function with the reference pattern of $\langle S \rangle_j$ is at l=0. If, opposite to case (A), the clock pulses 126 are advanced in phase as compared to the clock pulses 128, which corresponds to the case (C) of FIG. 9, the aforementioned maximum of the correlation function will be situated at l=+n (provided that the maximum is situated at l=−n in the case of a delay of phase). It allows, therefore, the DSP 38 to re-establish the equality of the phase between clock pulses 126 and 128 (FIG. 4), to determine, by calculating, the maximum of the correlation function $C_l$, and to impose on the programmable clock 42 a phase delay equal to the position of this maximum. One will note nevertheless that the preceding conclusions are strictly exact only if the frequencies of the clock pulses 126 and 128 are exactly the same, that is to say, if one has $F_0 = F_{OSC}/M = 1/T_D$.

If, on the contrary, there exists a slight difference in frequency, which in practice is always the case when two oscillators are independently constructed, then one can write $F_I = F_P(1+E)$, where $F_I$ designates the frequency of the implant clock pulses 126 and $F_P$ the frequency of the programmer clock pulses 128. One knows that, if E<<1, then the difference in phase of a complete analysis window duration $T_D$ will reappear at the end of a time on the order $T_D/E$, i.e., 1/E windows. If clock pulses 126 and 128 are, advantageously, produced by quartz oscillators, then E will be on the order $10^{-4}$. Thus, if the synchronization signal comprises 100 emissions of the same symbol, the difference in phase between the first and the last emission will be on the order $10^{-2}$ window durations $T_D$ and will be able to be neglected in the present application, where the period of sampling will be advantageously equal to $1/F_e = 1/(32 T_D)$. In this case, the relative difference in phase between clock pulses 126 and 128 will be on the order of a third of this period after a complete synchronization phase.

Exchanged Message Structure Once the Synchronization is Established

Advantageously, in the present invention, messages exchanged from the programmer to the implant via telemetry signals, as well as from the implant to the programmer, are realized by group of sub-messages called "frames". Because of the energy supply available in the programmer, as compared to the active medical implant devices, the signal/noise ratio in the direction of the programmer to implant can be far greater than in the other direction, and the transmission from the programmer to the implant can be made by coding bits by the presence or the absence of a signal in a predetermined temporal window. If the programmer and the implant have been previously synchronized, the temporal window will be able to be reduced to the period $T_d$ of clocks 18 and 42, respectively of the implant and of the programmer, conferring thus the same speed in the direction of the programmer to implant as in the other direction, which constitutes an original characteristic of the invention and substantial improvement in relation to known systems, in which the transmission from implant to programmer is generally the most rapid.

Figure 10:
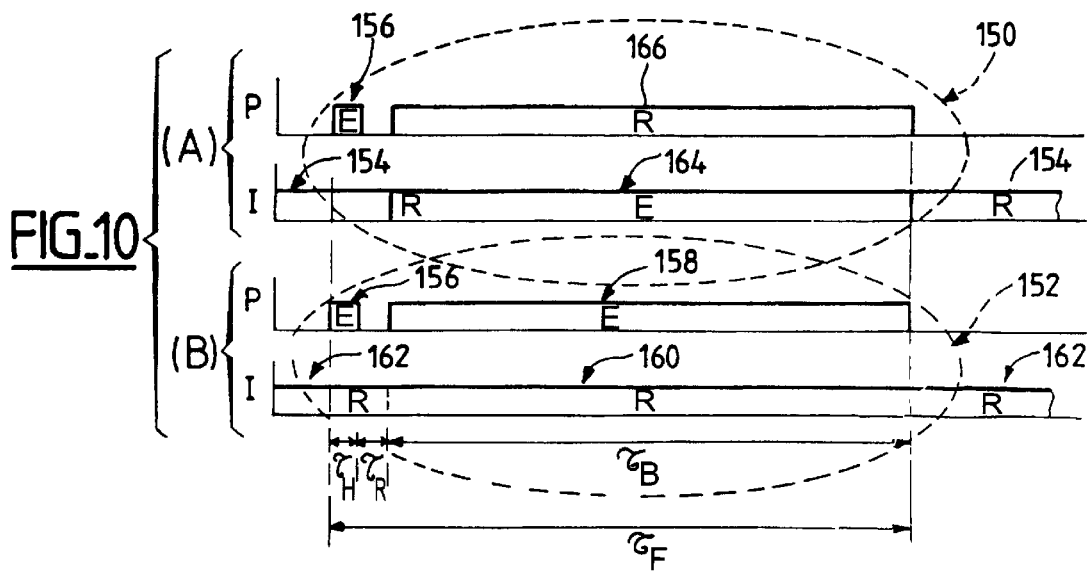
FIG. 10 is a timing diagram presenting the manner in which the bi-directional data exchange, in the form of reference signals, is realized according an embodiment of the invention.

Frames define instants where the delivery of symbols by the programmer and the implant are authorized, these frames being effective after synchronization between the two devices is established. FIG. 10 presents the manner in which the exchanges of data are realized in accordance with this placement of frames. The case (A) of FIG. 10 corresponds to a frame 150 in the course of which messages go mainly from the implant to the programmer, the case (B) corresponds to a frame 152 in the course of which messages go mainly in the other direction. The duration of each frame is designated by $T_f$ and will be, as well as each duration playing a role in the frames, a multiple of the analysis window duration $T_D$ in the programmer and in the implant. Before the frame signal 150 begins, one waits for the preceding framework to be ended. The programmer is then inactive and the implant is in a mode of reception 154.

When the frame begins, in a manner imposed by the programmer, which will be a master in relation to the implant, a heading 156 is emitted by the programmer. This heading 156 contains information indicating to the implant that the implant has then to emit information to the programmer. The heading is, for example, formed by a signal of duration $T_H=4T_D$ transporting four bits and presenting a common structure in all cases (that is, in frames 150 as well as 152), with a frame beginning bit (bit '1', corresponding to an emission always present in a coding in "all or nothing") followed by three bits of message (as clarified below). If the frame 152 is a frame "programmer to implant", after a eventual duration of rest time $T_R$, the programmer emits signals in the field 158, of duration $T_E$, that the implant receives and interprets. During the emission of this field 158 by the programmer, the implant is then in a state of reception in field 160, of duration $T_B$. After the end of this field 160, the implant returns to a state of reception in field 162, in wait of a new heading of a frame. The bits are advantageously emitted in the field 158 by the presence or the absence of a signal, and similarly in the heading 156 (coding in "all or nothing"), the absence of signal received by the implant, in the field 162, will cease to be interpreted as a datum.

If the frame is of the type "implant to programmer" (frame 150), then the implant, after an eventual rest time duration $T_R$, is going to emit a message to the programmer, in the field 164. The programmer then decodes the message in the field 166 of the frame.

The last three bits of the heading (the aforementioned message bits) can serve to control exchanges between the programmer and the implant, especially to remedy transmission errors detected by the system. These bits can advantageously have the following meanings:

'111' (I to P): the implant is going to emit a synchronization frame;
'100' (I to P): the implant is going to send data to the programmer;
'010' (P to I): the programmer is going to send data to the implant;
'001' (P to I): pause;
'000' (P to I): end of session;
'110' (I to P): the implant is going to return the same field of data as in the preceding frame;
'100' (P to I): the implant does not take in account the latest frames it receives and will take in account the data that follows;
'011': no significance.

One will note that the message '111', which asks the implant to emit a synchronization frame, is coded in manner to be understood by the implant without synchronization having been already established. Indeed, the detection by the implant of signals sent by the programmer being made by detection or not of the presence of these signals during the analysis window duration $T_D$, the detection of a synchronization request frame is equivalent to detect the presence of a signal, for example, during a plurality of successive analysis windows (typically, four successive analysis windows). Indeed, if these signals succeed with a period less than or equal to a fraction of $T_D$, regardless of the state of synchronism between implant and programmer clocks pulses 126 and 128, the implant will see the presence of a signal at the output of its reception circuits during at least four (in the considered example) of these temporal analysis windows and will interpret the presence of these repeated signals as a heading comprising the message '111', which will release from it the delivery of a synchronization frame.

Resynchronization During Transmission

It will be understood that symbols can be suitably decoded only if the programmer and the implant have been previously synchronized, this decoding being operated by evaluating at a particular instant 0 the correlation function. But, during the transmission of a frame 150, a fraction of the temporal window corresponds to a delay of de-synchronization that appears at the end of a frame. As one has seen above, with clocks controlled by quartz oscillators, the number of temporal windows can be on the order a hundred before the de-synchronization becomes too large. If $F_I$ is the frequency of the implant clock pulses 126 and $F_P$ is the frequency of the programmer clock pulses 128, and these frequencies are linked by $F_I=F_P(1+E)$, with $E<<1$, and that a frame has a duration of K windows, then at the end of the duration, the de-synchronization is on the order $KET_D$, where $T_D$ is the duration of a temporal analysis window.

If the correlation function between a symbol and the reference pattern serving to detect the symbol is maximal at the time 0 at the beginning of a frame, it will be offset by $KET_D$ as compared to its reference window reference at the end of this frame. Consequently, if one observes the correlation function in a window having width $2KET_D$ centered at 0, the maximum of this function will belong to the window in question. More precisely, at the $j^{th}$ observed cell (an observation time corresponding to $T_D$), the difference of the correlation function will be $\Delta_j=jET_D$. If DSP 38 undertakes the operation:

$$\Sigma_\Delta = \sum_{j=0}^{k-1} \Delta_j;$$

one will the have $\Sigma_\Delta=[K(K-1)/2]ET_D$ and, if K is large $\Sigma_\Delta=K^2/2)ET_D$. The delay $KET_D$ at the end of frame is therefore linked to $\Sigma_\Delta$ by the relationship $KET_D=(2/K)\Sigma_\Delta$.

One will understand that, if one determines the correlation function maximum in a window of width $2KET_D$ at each window, and if one averages the instants of maxima, one obtains then a quantity that allows to know the difference of phase at the end of a frame. This difference of phase is then introduced in the programmable clock 42 so as to operate a re-synchronization, which allows, in a characteristic manner of the invention, to proceed to the re-synchronization during transmission. One will have also noted that, if messages are transmitted to the implant in a type frame 152 (FIG. 10), it will be necessary to insert a type frame 150 in the transmission, because it is during these frames that the programmer will have the possibility to re-synchronize on the implant.

It should be understood that the references to the clock frequencies, clock pulses and clock signals are to be considered as synonyms in that it is the period and a particular point in a period from which the phased delay can be interpreted, e.g., the rising edge of a pulse in a pulse train, and not the particular shape or form of the clock output signal.

One skilled in the art will appreciate that the present invention can be practical by other than the described embodiments, which are presented for purposes of explanation and not of limitation.

We claim:

1. A system comprising:
   an active implanted medical device;
   a programmer for said active implanted medical device; and
   a bi-directional synchronous serial connection for signals passing between the active implanted medical device and the programmer;
   the active implanted medical device (10) further comprising a timing clock having a frequency (18) and means for emitting a telemetry signal to pass to the programmer and for receiving a telemetry signal passing from the programmer, said means operating under a temporal control of the active implanted medical device timing clock;

the programmer (24) further comprising a programmable timing clock (42) having a frequency that is adjustable in phase, means for emitting a telemetry signal to pass to the active implanted medical device and for receiving a telemetry signal passing from the active implanted medical device, said means operating under the temporal control of the programmer timing clock, a means of synchronization control (32, 36, 38, 40) cooperating with said programmable clock for analyzing a telemetry signal received from the active implanted medical device and to lock in phase the programmable clock on the active implanted medical device timing clock.

2. The system of claim 1, wherein the active implanted medical device means for emitting further comprises a programmer synchronization frame (132) to establish initially a synchronism between the active implanted medical device and the programmer, and the means of synchronization control further comprises means to receive the synchronization frame, to correlate the received synchronization frame ($S_j$) with a reference pattern ($T_j$), to determine a difference (l) in phase based on the correlation, and to offset the programmable clock by a value corresponding to said determined phase difference.

3. The system of claim 2, wherein the programmer means for emitting further comprises an interrogation signal (130) emitted to pass to the active implanted medical device, said interrogation signal being recognizable by the active implanted medical device even in the absence of synchronism of the transmission, and wherein the active implanted medical device emits the synchronization frame in response to said interrogation signal.

4. The system of the claim 2, in which the synchronization frame comprises a periodic signal and the means of synchronization control comprises means for averaging said periodic signal before correlation with the reference pattern.

5. The system of the claim 1, wherein the means of control of synchronization of the programmer comprises means to receive a data frame emitted by the active implanted medical device, to correlate the continuation by periodicity of the received data frame ($<S>_j$) with a reference pattern, to determine a temporal difference (l) based on said correlation, and to offset the programmable clock of a value corresponding to this difference to maintain the programmable clock locked in phase on the active implanted medical device timing clock.

6. The system of claim 1, wherein the means of control of synchronization of the programmer further comprises a programmable digital circuit (38).

7. The system of claim 6 wherein the programmable digital circuit further comprises a memory, a digital signal processor (DSP), and a control program for said DSP.

8. The system of claim 7, wherein said control program further comprises a downloaded program, in a manner to be able to modify this program without hardware modification of the programmer.

9. A method of telemetry between an active implanted medical device and a programmer comprising:

providing the active implanted medical device with a timing clock having a first frequency;

providing the programmer with a timing clock having a second frequency which is programmable in phase;

transmitting a synchronization signal from said active implanted medical device under the control of the active implanted medical device timing clock;

detecting the synchronization signal at the programmer;

analyzing the detected synchronization signal and determining a difference in phase between said synchronization signal and said second frequency, and adjusting said programmer programmable clock to lock in phase said programmer programmable clock on said active implantable medical device timing clock.

10. The method of claim 9 wherein transmitting the synchronization signal further comprises providing a telemetry signal having at least two symbols therein, and analyzing the detected synchronization signal further comprises averaging the at least two symbols and comparing the averaged symbols to a reference pattern and determining the difference based on the average and the reference pattern.

11. The method of claim 9 further comprising transmitting an interrogation signal from the programmer to the active implanted medical device, wherein the step of transmitting the synchronization signal occurs in response thereto.

12. The method of the claim 9, further comprising: subsequent to locking in phase the programmable clock, transmitting a data signal from the active implanted medical device to the programmer, correlating in the programmer the continuation by periodicity of the data signal ($<S>_j$) with a reference pattern, determining a temporal difference (l) based on said correlation, and adjusting the programmable clock by a value corresponding to the determined temporal difference to maintain the programmer programmable clock locked in phase on the active implantable medical device timing clock.

13. A programmer system having bi-directional synchronous telemetry communications for use with an active implanted medical device having a timing clock and telemetry signals emitted under temporal control of said timing clock, comprising:

a programmer head having a coil for receiving a telemetry signal, an analog to digital converter having an analog input corresponding to a received telemetry signal and a digital output corresponding to said analog input, the analog to digital converter having a sample rate control input to control the rate of sampling of the analog signal;

a programmable timing clock having an output frequency that is adjustable in phase;

means for processing the digital output from said analog to digital converter, determining a difference in phase between the digital output and the programmable timing clock output frequency, and adjusting the phase of the programmable timing clock to lock it in phase with the digital output.

14. The programmer system of claim 13, wherein the processing means further comprises means to receive a synchronization signal, to correlate the received synchronization signal ($S_j$) with a reference pattern ($T_j$), to determine a difference (l) in phase based on the correlation, and to offset the programmable clock by a value corresponding to said determined phase difference.

15. The programmer system of claim 14, wherein the processor means further comprises means for emitting an interrogation signal (130), said interrogation signal being recognizable by an active implanted medical device even in the absence of synchronism of the transmission.

16. The programmer system of claim 14, in which the processing means further comprises means for identifying a received synchronization signal containing a periodic signal therein and averaging said periodic signal before correlation with the reference pattern.

17. The programmer system of claim 13, wherein the processor means comprises means to receive a data frame signal emitted by an active implanted medical device, to correlate the continuation by periodicity of the received data frame signal ($<S>_j$) with a reference pattern, to determine a temporal difference (l) based on the correlation, and to offset the programmer programmable clock by a value corresponding to the determined temporal difference to maintain an established synchronism.

18. The programmer system of claim 13, wherein the processor means further comprises a programmable digital circuit (38).

19. The programmer system of claim 18 wherein the programmable digital circuit further comprises a digital signal processor (DSP), a DSP memory, and a control program for said DSP.

20. The system of claim 19, further comprising a microcomputer unit having a reprogrammable program memory, wherein said control program for the DSP is initially stored in said program memory and is downloadable to the DSP memory for operating the DSP, and wherein the operation of the DSP can be modified by a reprogramming of the control program stored in the program memory without hardware modification of the programmer.

* * * * *

UNITED STATES PATENT AND TRADEMARK OFFICE
CERTIFICATE OF CORRECTION

PATENT NO. : 5,899,931
DATED : May 4, 1999
INVENTOR(S) : Deschamp et al.

It is certified that error appears in the above-identified patent and that said Letters Patent is hereby corrected as shown below:

Column 1,
Line 32, after "itself" delete "restrictive" and insert -- restricted --;
Lines 33-34, after "construed" insert -- as --; and after "autonomous" delete "device" and insert -- devices --;
Line 43, after "placed in" insert -- the --; after "that is" insert -- , -- ; and before "proximity" delete "the";

Column 2,
Line 10, after "In" delete "others" and insert --other --;
Line 49, after "In" delete "others" and insert -- other --;
Line 56, after "signals in" insert -- the --;

Column 3,
Line 31, after "i.e." insert -- , --;
Line 66, after "access" delete ",";

Column 4,
Line 14, after "according" insert -- to --;
Line 23, after "patient" delete ",";
Line 35, before "essentially" delete "of"
Line 66, after "namely" insert -- , --;
Lines 66 and 67, after, respectively, "namely" and "described" insert -- , --;

Column 5,
Lines 4-5, after "signal Samples $Sj$" delete "," and insert -- . --;
Line 6, after "which" delete "is" and insert -- are --;
Line 21, after "etc." delete ","; and after "shown)" insert -- , --;
Line 54, after "programmable" insert -- - --;
Line 57, after "so-called" delete "the";
Line 62, after "46," delete "also";

Column 6,
Line 5, after "higher" insert -- - --;
Line 14, after "systems" delete "could" and insert -- can --;
Lines 34-35, after "allowing" delete "to reduce" and insert -- reduction in --; and after "and/or" delete "to transmit" and insert -- transmission of --;

UNITED STATES PATENT AND TRADEMARK OFFICE
CERTIFICATE OF CORRECTION

PATENT NO. : 5,899,931
DATED : May 4, 1999
INVENTOR(S) : Deschamp et al.

It is certified that error appears in the above-identified patent and that said Letters Patent is hereby corrected as shown below:

Column 8,
Line 5, after "that is" insert -- , -- ;
Line 7, after "course" insert -- of --;
Lines 18-19 (beginning with the word "processing"), after "loss of" delete "times inherent to" and insert -- time inherent in --; and after "which," insert -- for --;
Line 36, (beginning with the words "to provide"), after "$F_e=F$" delete "$_{osc}/N$" and insert -- $_{ocs}/N$ --;
Line 43, (beginning with the word "between"), after "then" delete "$F_e={P/TD}$" and insert -- $F_e=P/T_D$ --;
Line 49, (beginning with the word "say"), after "say" insert -- , --;
Line 59, (beginning with the words "To realize"), after "realizes" insert -- , --; and after "all" insert --, --;

Column 9,
Line 10, (beginning with the words "curved"), after "judged" delete "to be" and insert -- as --;
Lines 3 and 15, after "$_e$" and "$_{P-1}$", respectively, delete "$_1$" and insert -- $_[$ --; and -- $_]$ --;
Lines 23-24 (beginning with the word "continuation") and line 26 after "designate <S" insert -- ~ --; after "similar to <S" insert -- ~ --; and after "*<S" insert -- ~ --;
Lines 27-29, after "function [<S" insert -- ~ --; after "*<S" insert -- ~ --; after "<$S_n$" insert -- ~ --; and after "=<S" insert -- ~ --;
Line 30, after "In" delete "others" and insert -- other --;
Line 50, after "designate" delete "the by" and insert -- by the --;

Column 10,
Line 9, after "$F_o=F$" delete "$_{osc}/$" and insert -- $_{osc}/$ --;
Line 36, (beginning with the words "are realized"), after "realized by" insert -- a --;
Line 46 (beginning with the words "of clocks"), after "respectively" insert -- , --;

Column 11,
Line 12, after "after" delete "a" and insert -- an --;
Lines 44-45 (beginning with "'100'"), after "not take" delete "in" and insert -- into --; and after "will take" delete "in" and insert -- into --;
Line 49, (beginning with the word "implant"), after "in" insert -- a --;
Line 55, (ending with the words "presence of"), after "equivalent to" delete "detect" and insert -- detecting --;

Column 12,
Line 7, after "order" insert -- of --;

UNITED STATES PATENT AND TRADEMARK OFFICE
CERTIFICATE OF CORRECTION

PATENT NO. : 5,899,931  
DATED : May 4, 1999  
INVENTOR(S) : Deschamp et al.

It is certified that error appears in the above-identified patent and that said Letters Patent is hereby corrected as shown below:

Column 12, cont'd,  
Line 30, (beginning with the word "one"), after "will" delete "the" and insert -- then --;  
Line 30, (beginning with the word "one"), after "large" insert -- , --;  
Line 31, after "=" insert -- ( --;  
Line 36, (beginning with the word "obtains"), after "allows" insert -- one --;  
Line 55, after "can be" delete "practical" and insert -- practiced --;

Column 13,  
Line 38, (beginning with "4."), after "system of" delete "the"; and after "2" delete ",";  
Line 42, after "system of" delete "the";  
Line 55, after "6" insert -- , --;

Column 14,  
Line 11, after "9" insert -- , --;  
Line 15, after "averaging" delete "the";  
Line 22, after "method of" delete "the"; and after "9" delete ",";  
Line 65, (beginning with "16."), after "14" delete ",";

Column 16,  
Line 1, after "18" insert -- , --;  
Line 5, after "19" delete ",";

ABSTRACT,  
Line 11, after "data" delete "there-between" and insert -- therebetween, --;

Signed and Sealed this

Eleventh Day of December, 2001

*Attest:*

NICHOLAS P. GODICI  
*Attesting Officer*  *Acting Director of the United States Patent and Trademark Office*